(12) United States Patent
Geisel et al.

(10) Patent No.: US 10,541,730 B2
(45) Date of Patent: Jan. 21, 2020

(54) NUCLEAR POWER PLANT CONTAINMENT REAL-TIME REMOTE OPERATIONS MANAGEMENT EMPLOYING SERVER AND CLIENT

(71) Applicant: WESTINGHOUSE ELECTRIC COMPANY LLC, Cranberry Township, PA (US)

(72) Inventors: Geoffrey G. Geisel, Cranberry Township, PA (US); Gregory P. Barry, Pittsburgh, PA (US); Brian J. Rupert, Wexford, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 191 days.

(21) Appl. No.: 15/134,577

(22) Filed: Apr. 21, 2016

(65) Prior Publication Data
US 2016/0315666 A1 Oct. 27, 2016

Related U.S. Application Data

(60) Provisional application No. 62/151,135, filed on Apr. 22, 2015.

(51) Int. Cl.
*H04B 5/00* (2006.01)
*H04L 29/06* (2006.01)
*G06K 7/10* (2006.01)

(52) U.S. Cl.
CPC .......... *H04B 5/0062* (2013.01); *H04L 67/42* (2013.01); *G06K 7/10405* (2013.01)

(58) Field of Classification Search
CPC ................ H04B 5/0062; H04L 67/42
See application file for complete search history.

(56) References Cited

U.S. PATENT DOCUMENTS

| 7,978,050 B2 * | 7/2011 | Moshfeghi | H04L 47/10 340/10.2 |
| 2006/0214773 A1 * | 9/2006 | Wagner | G06K 7/0008 340/10.2 |

(Continued)

FOREIGN PATENT DOCUMENTS

| JP | 2005346587 A | 12/2005 |
| JP | 2007026128 A | 2/2007 |

(Continued)

OTHER PUBLICATIONS

PCT/US2016/028555 International Search Report and Written Opinion dated Aug. 10, 2016, 10 pages.

(Continued)

*Primary Examiner* — Thomas D Alunkal
(74) *Attorney, Agent, or Firm* — Joseph C. Spadacene; Westinghouse Electric Company LLC

(57) ABSTRACT

A server-based nuclear containment operations system can be used to monitor structures, systems, components, and personnel within the containment building of a nuclear power facility. The disclosed and claimed concepts relate generally to a method for utilizing near field communication (NFC) on a mobile client device having the dynamic capabilities of a logic-based computerized procedures system (CPS). The client permits the execution of procedures remotely in the field while monitoring the real-time current state and operation of the systems, components, and sensors of a large facility such as a nuclear power plant. This system consists of a client and server application which provide real-time monitoring of procedure adherence and place keeping, facility clearance information, and work order administration (including tracking an operator's procedure adherence) and further provides a capability for operator input. The client portion of the system is wireless and is designed to be taken into the field, which would include (Continued)

areas such as radiological and hazardous area where retrieval of completed paperwork can be impractical. The client has the capability to use NFC for physical component identification which enables clearance verification.

9 Claims, 4 Drawing Sheets

(56) References Cited

U.S. PATENT DOCUMENTS

| | | | | |
|---|---|---|---|---|
| 2013/0002433 | A1* | 1/2013 | Wilmeth | G08B 21/22 |
| | | | | 340/573.4 |
| 2013/0154800 | A1* | 6/2013 | Holmes | G06Q 10/06312 |
| | | | | 340/10.1 |
| 2014/0278638 | A1* | 9/2014 | Kreuzkamp | G06Q 10/06398 |
| | | | | 705/7.15 |
| 2016/0103198 | A1* | 4/2016 | Swope | G01S 3/28 |
| | | | | 342/372 |

FOREIGN PATENT DOCUMENTS

| | | |
|---|---|---|
| JP | 2008046755 A | 2/2008 |
| KR | 1020050014365 A | 2/2005 |

OTHER PUBLICATIONS

Westinghouse Electric Company, LLC, EP Patent Application No. 16783819.2, Extended Search Report, dated Oct. 18, 2018, 7 pages.

* cited by examiner

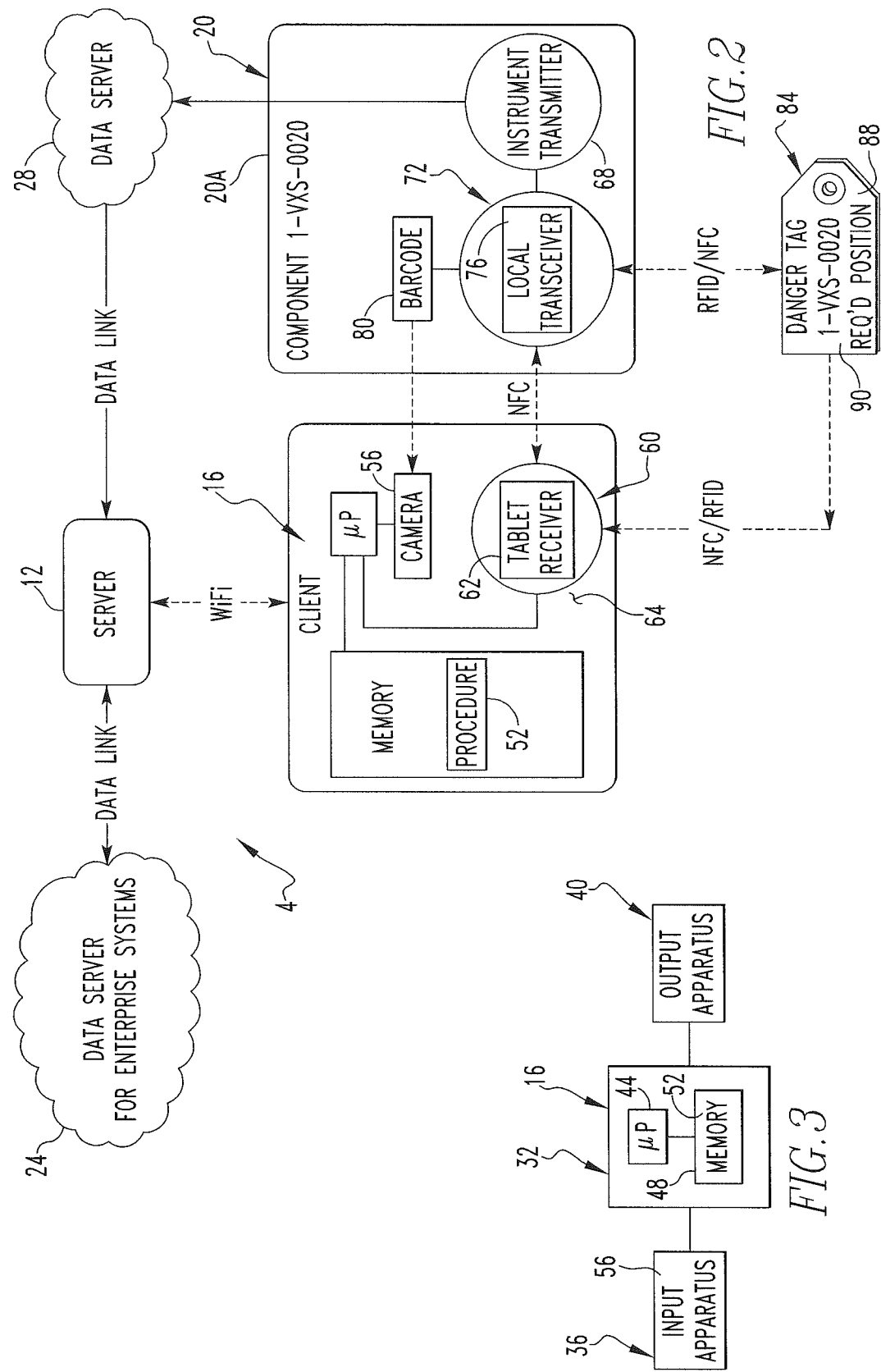

NUCLEAR POWER PLANT CONTAINMENT REAL-TIME REMOTE OPERATIONS MANAGEMENT EMPLOYING SERVER AND CLIENT

CROSS-REFERENCE TO RELATED APPLICATION

The instant application claims priority from U.S. Provisional Patent Application Ser. No. 62/151,135 filed Apr. 22, 2015, the disclosures of which are incorporated herein by reference.

BACKGROUND OF THE INVENTION

Field

The disclosed and claimed concept relates generally to nuclear power generation and, more particularly, to a method of performing an operation on a nuclear facility and a related apparatus.

Related Art

In order to perform operations such as maintenance and inspection activities, among others, personnel are sometimes required to enter into radiologically controlled areas such as a nuclear power plant containment building. In many instances, regulations require that the person completing the maintenance/inspection be accompanied by additional persons such as a monitor, quality control advisor, or supervisor. As such, the number of personnel exposed to a radiation hazard is increased. There is a need to allow these additional required personnel to view and monitor the maintenance and inspective activities.

Currently, radiological dosimetry is monitored via thermoluminescent dosimeters (TLD) and logged and tracked by non-digital means from the screen readings on each dosimeter to ensure that radiological dosage during a nuclear power plant's maintenance and refueling outage is as low as reasonably achievable (ALARA).

Furthermore, various operations such as maintenance operations and other operations must be performed on or in connection with various components of a facility such as a nuclear power plant, and it is understood that a nuclear power plant contains a very large number of components, many of which may appear to be similar to one another. The similar appearance of many of the various components of a facility can make the performance of an operation even more difficult due to the problems inherent in identifying a particular component that is to be the subject of an operation.

While computerized procedures have been developed to provide dynamic feedback from the server to assist in making correct decisions, these procedures have been primarily for use in the main control room of a nuclear power plant. Improvements thus would be desirable.

SUMMARY

A server-based nuclear containment operations system can be used to monitor structures, systems, components, and personnel within a containment building of a nuclear power facility. The disclosed and claimed concepts relate generally to a method for utilizing near field communication (NFC) on a mobile client device having the dynamic capabilities of a logic-based computerized procedures system (CPS). The client permits the execution of procedures remotely in the field while monitoring the real-time current state and operation of the systems, components, and sensors of a large facility such as a nuclear power plant. The system includes of a client and server which provide real-time monitoring of procedure adherence and place keeping, facility clearance information, and work order administration (including tracking an operator's procedure adherence) and further provides a capability for operator input. The client portion of the system is wireless and is designed to be taken into the field, which would include areas such as radiological and hazardous area where retrieval of completed paperwork can be impractical. The client has the capability to use NFC for physical component identification which enables clearance verification.

Accordingly, an aspect of the disclosed and claimed concept is to provide an improved method of performing an operation in a facility such as a nuclear installation.

Another aspect of the disclosed and claimed concept is to provide an improved tablet employing NFC or radio frequency identification (RFID) technology to interrogate one or more tags or labels that are associated with a component of the facility and that are situated on the component and, when interrogated, enable the component to be correctly identified.

Another aspect of the disclosed and claimed concept is to provide an improved method by which an active tag on a component of the facility can employ NFC or RFID to interrogate an additional tag on the component in order to ensure that the additional tag is correctly situated on the component.

Accordingly, an aspect of the disclosed and claimed concept is to provide an improved method of employing a server and a client in performing an operation on a facility, the facility having a plurality of components, the operation involving a particular component from among the plurality of components, the client being remote from the server, the client and the server being in communication with one another. The method can be generally stated as including communicating from the server to the client a signal that is representative of an instructed activity of the operation, outputting on the client device an output that is representative of the instructed activity, interrogating a given component of the plurality of components with the client, receiving on the client from the given component an identification input that is representative of an identity of the given component, employing the identification input to make a confirmation that the given component is the particular component and, based at least in part on the confirmation, concluding that the instructed activity is completed.

BRIEF DESCRIPTION OF THE DRAWINGS

A further understanding of the disclosed and claimed concept can be gained from the following Description when read in conjunction with the accompanying drawings in which:

FIG. 2 is another schematic depiction of the system of FIG. 1;

FIG. 3 is a schematic depiction of a client of the system of FIGS. 1 and 2; and

Similar numerals refer to similar parts throughout the Specification.

DESCRIPTION

Figure 1:
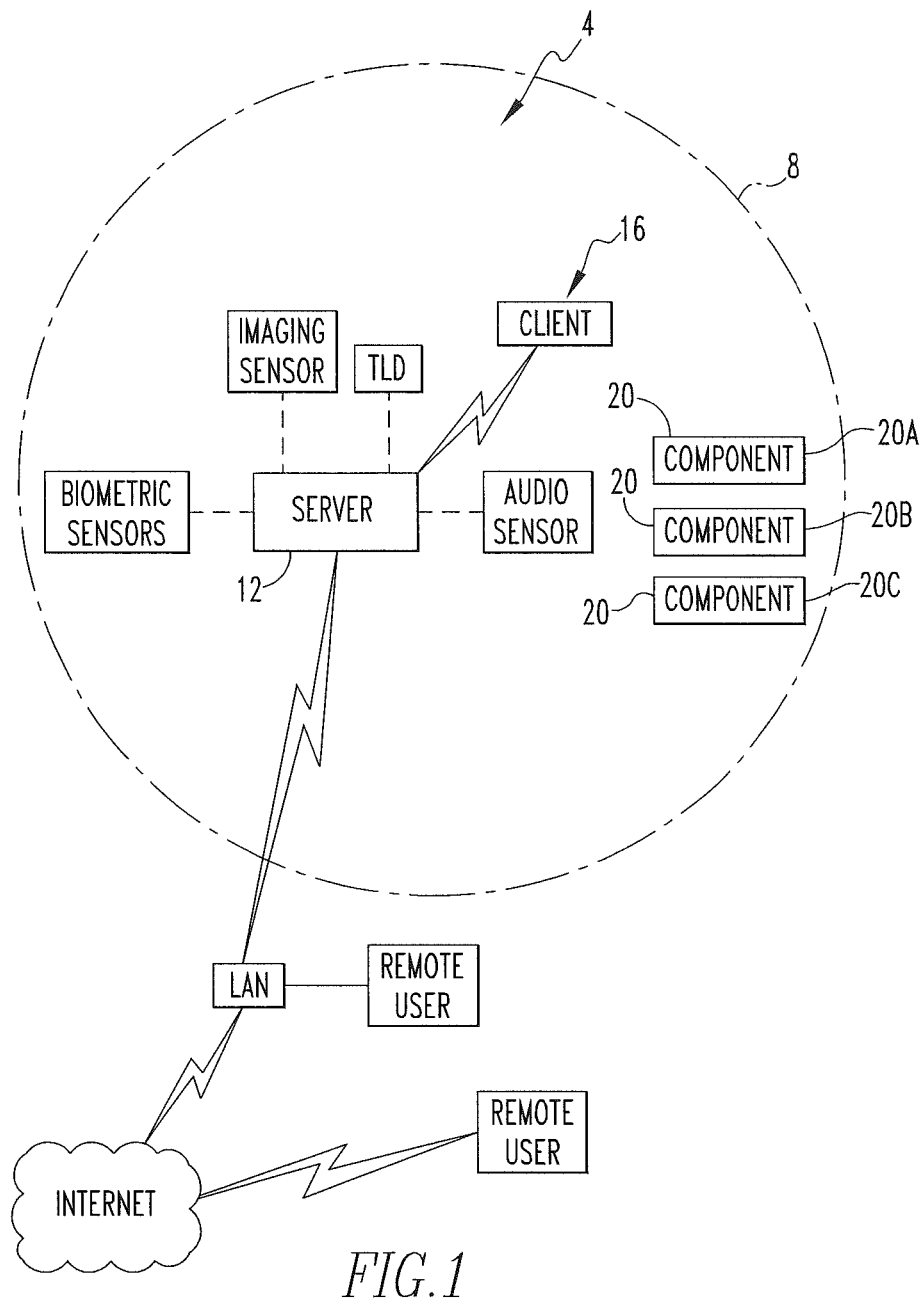
FIG. 1 is a schematic depiction of an improved system in accordance with the disclosed and claimed concept that can be used to perform an improved method in accordance with the disclosed and claimed concept.
Figure 4A:
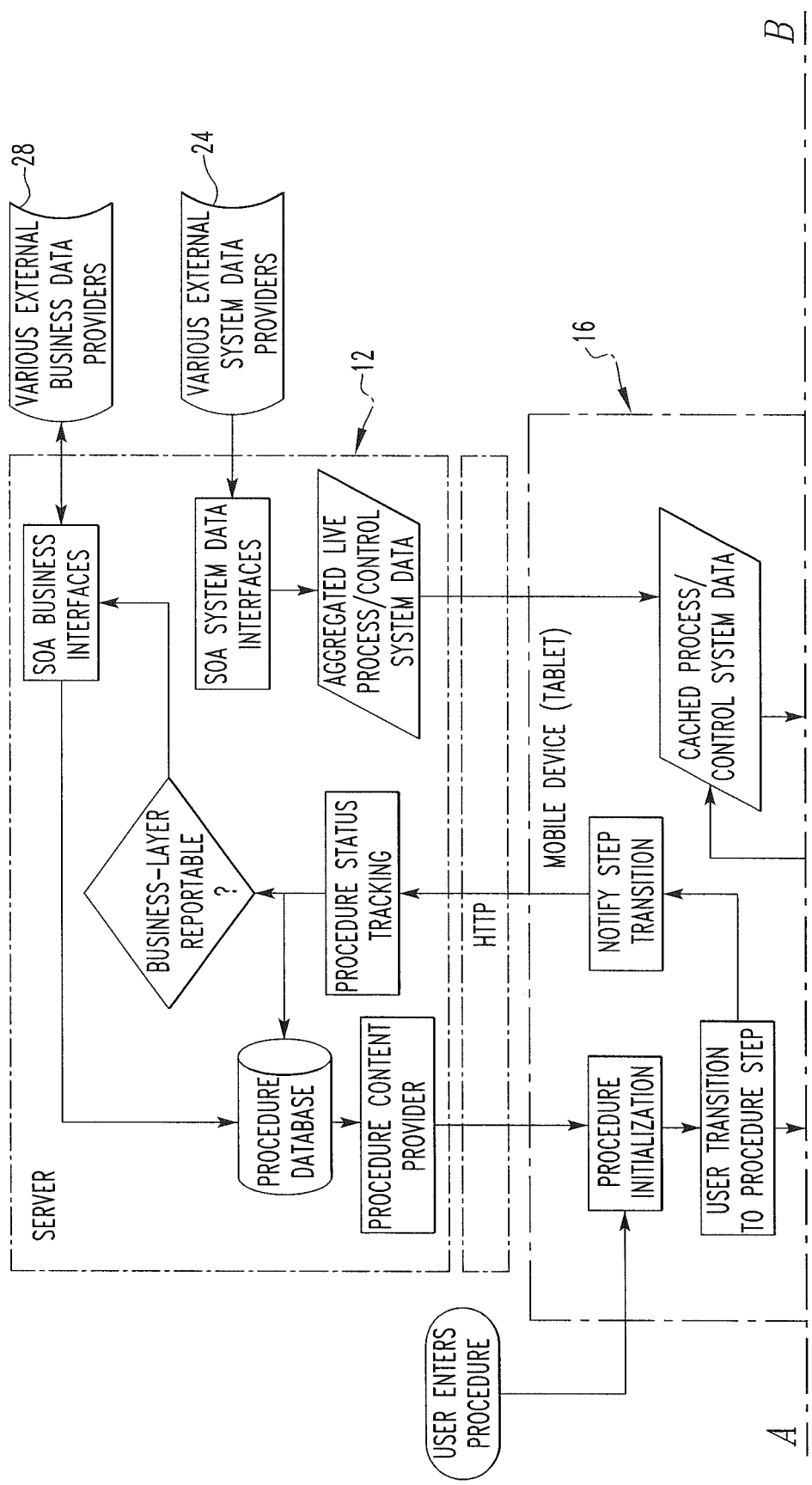
FIGS. 4A and 4B depict a data flow diagram showing some of the data operations that are performed by the system of FIGS. 1 and 2.
Figure 4B:
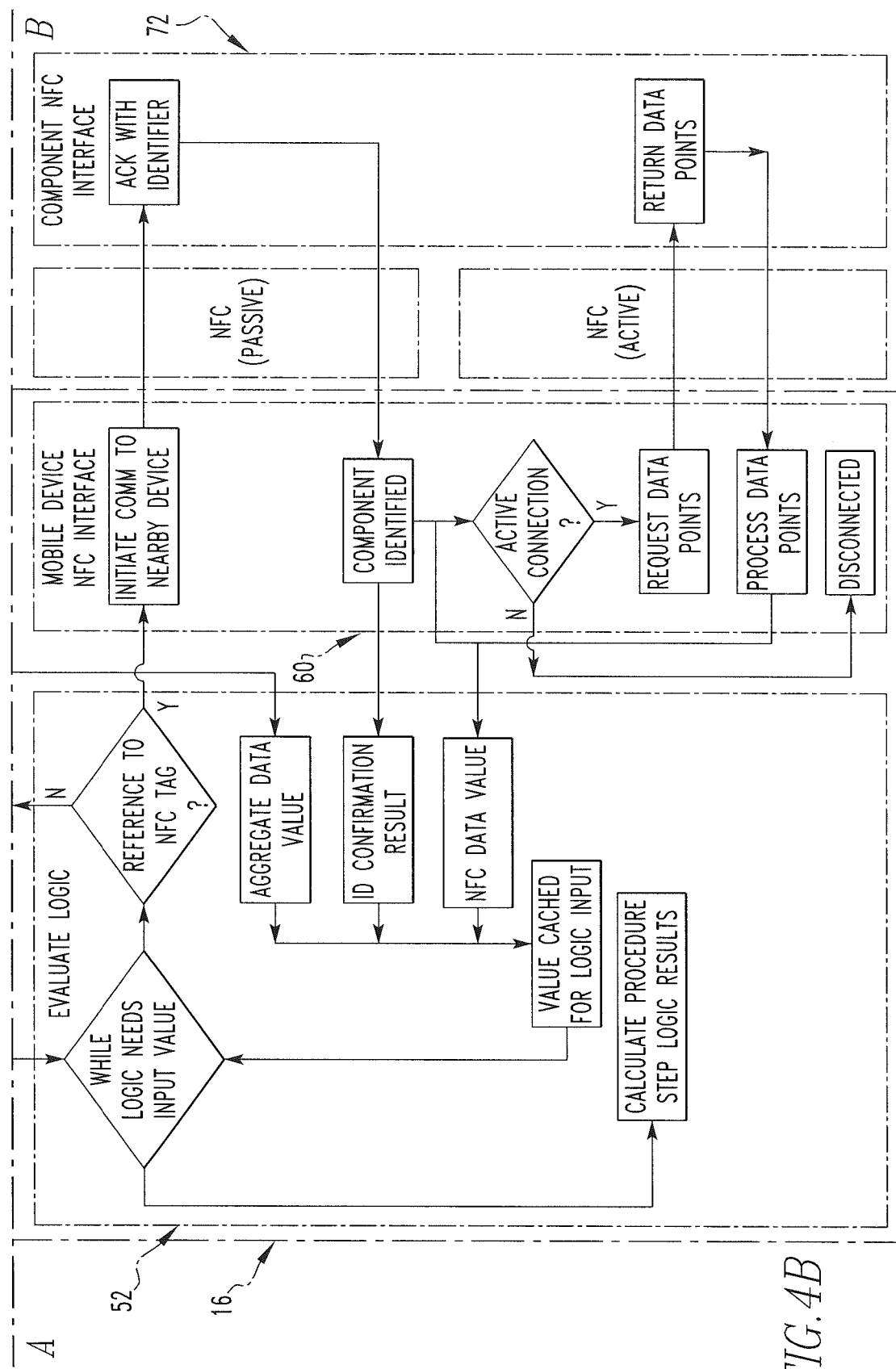

A system 4 is shown schematically in FIG. 1 and is depicted as being used in conjunction with a nuclear containment 8 of a nuclear power plant. The system 4 includes a server 12 which is utilized to easily and efficiently transmit critical data from radiologically controlled areas via imaging sensors, audio equipment, biometric sensors (i.e., body temperature sensors, heart rate monitors), and radiological dosimetry measurements via wireless communications within a nuclear power plant's containment 8 and transmit this critical data via the server 12 to authenticated users globally who are located in safe, non-radiologically controlled environments to reduce overall nuclear outage dosages. This also increases data accessibility to qualified analysts globally who can interpret that data to make critical decisions without requiring travel to the site. While the exemplary system 4 is depicted in FIG. 1 as being situated inside the nuclear containment 8, it is noted that certain components of the system 4, such as the server 12 or other components of the system 4, can likewise be situated outside the nuclear containment 8 without departing from the spirit and scope of the disclosed and claimed concept.

To ensure that ALARA radiological dosage is maintained, the system 4 allows visual and audio monitoring of the containment building to occur from a non-radiologically controlled area. This monitoring allows audio, visual, biometrics, and radiological dosage information to be tracked from an area where the overall project dosage is not increased. This will reduce the number of workers that would be necessary inside the containment, which advantageously increases the overall safety of the containment entry. The system 4 also tracks the radiological dosage as monitored by a separate device (e.g., as monitored by the radiological sensors) which monitors and communicates (wirelessly or hard wired) data to the server 12 which communicates that information to the non-radiologically controlled area and elsewhere.

The server 12 functions as a communications server that connects all nuclear containment surveillance monitoring sensors to a local area network. The local area network advantageously provides the collected information to personnel outside of the radiologically controlled area to significantly reduce overall worker radiation exposure.

The radiological sensors may be implemented in the following exemplary manner: The radiological dosage can be monitored via an analog signal measurement system comprising: i) one or more thermoluminescent dosimeters configured to generate output data for an analog signal that is wirelessly transmitted to the server device, ii) a number of upper level discriminators configured to generate output data for the analog signal less than a programmable level, and/or iii) one or more logic devices configured to generate output data for programmable combinations of the output data from one or more lower level discriminators and the one or more upper level discriminators. As employed herein, the expression "a number of" and variations thereof shall refer broadly to any non-zero quantity, including a quantity of one.

The system 4 is also structured to be an audio/video/biometric/radiological dosimetry monitoring system comprising a video camera unit that may include a video camera adapted to generate video and audio signals from within a nuclear power plant's containment building and a wireless transceiver for transmitting video, audio, biometric, and radiological dosimetry signals to a remote location. This may be in combination with a receiver unit having a wireless receiver for receiving signals transmitted from the camera unit and audio and video output terminals for outputting signals received by the receiver.

The system 4 includes a number of routines 52 which provide an electronic record of procedure completion, project document management, real time monitoring of procedure adherence, remote administration of documents, and/or project tracking and administration. The system 4 further includes a client 16 that is designed to be taken into radiological or other hazardous areas where retrieval of completed paperwork can be impractical. The server 12 can be set up outside the hazardous area and track the procedure adherence and document the completion paperwork for project reports.

The server 12 is depicted in FIG. 2 as being connected with a systems data server 24 and a business data server 28 that provide various appropriate data and other inputs to the server 12. The business data server 28 is depicted as being connected with a component 20A of the nuclear power plant facility (symbolized by the nuclear containment 8 in FIG. 1). FIG. 1 depicts the component 20A and additionally depicts other components 20B and 20C that are intended to represent the plurality of components that together from the nuclear power plant or other facility. The components 20A, 20B, and 20C may be individually and/or collectively referred to herein with the numeral 20, some or all of which being connected with the business data server 28.

The components 20 may be very similar in appearance to one another and/or may be in very close proximity to one another. Such similarity and/or proximity can make more difficult the performance of an operation, such as a maintenance operation or other operation, that involves any particular component 20 (it being reiterated that the components 20A, 20B, and 20C are merely representative of the vast number of components that together may form the facility). Such difficulty in the performance of an operation may be further enhanced since many of the components 20 may be situated within a nuclear environment in which documents that might otherwise assist in identifying a component 20 may be unavailable.

Advantageously, therefore, the client 16 is remote from the server 12 but is in communication therewith, such as by wireless communication as is depicted in the instant exemplary embodiment. The exemplary client 16 is in the form of a tablet device that includes a processor apparatus 32, an input apparatus 36, and an output apparatus 40, such as are depicted generally in FIG. 3. The processor apparatus 32 receives input signals from the input apparatus 36 and provides output signals to the output apparatus 40. The processor apparatus 32 includes a processor 44 and a memory 48 that are operatively in communication with one another. The memory 48 has stored therein the aforementioned routines 52 that are executable on the processor 44 to cause the client 16 and potentially the server 12 to perform certain operations.

The input apparatus 36 can include a camera 56 that is configured to read a barcode 80 or other indication that may be provided on a component 20. The client 16 additionally includes an NFC transceiver 60 that includes a receiver component 62 which can be considered to be a part of the input apparatus 36. The client 16 further includes a visual display 64 such as an LCD display and/or indicator lamps that are a part of the output apparatus 40. The LCD display may be a component of a touch screen on the client 16, with a touch component of such a touch screen being a part of the input apparatus 36.

The exemplary component 20A that is depicted in FIG. 2 has situated thereon an instrument transmitter 68 that is a part of the ordinary instrumentation of the component 20A and which is in communication with the business server 28 and, in turn, with the server 12. The instrument transmitter 68 is configured to communicate to the server 12 the operating parameters, status, conditions, etc. that are relevant to or that prevail in the component 20A. For example, if the component 20A is a valve, the various data elements that may be provided via the instrument transmitter 68 may include whether the valve is in an ON or an OFF condition, and may additionally or alternatively include pressure, temperature, flow rate, and/or any of a variety of other data that may be relevant to the computerized logic that is stored in and executed on the server 12 and/or the client 16.

The component 20A additionally includes an active NFC device 72 or "tag" that may be affixed to or situated on the component 20A and which includes a local transceiver 76 that can be interrogated by the NFC transceiver 60 of the client 16. When the NFC device 72 is interrogated by the client 16, the NFC device 72 can respond to the client 16 with an identification signal which, when received by the receiver 62, functions as an identification input that is representative of an identity of the component 20A. The identification input can then be wirelessly communicated from the client 16 to the server 12 in order to verify that the component 20A whose NFC device 72 has just been interrogated by the client 16 is the correct component 20 that is the target of the operation begun by the technician. The NFC device 72 can additionally be configured such that upon a further interrogation or other interrogation by the client 16, it will provide to the client 16 a status signal which, when received by the receiver 62, serves as a status input that is representative of a status of the component 20A, such as being in an ON state or an OFF state, a temperature, a pressure, etc., without limitation. The status of the component 20A can additionally be wirelessly communicated from the client 16 to the server 12 for use as an input by the computerized logic that is executed on the server 12.

Alternatively or additionally, a temporary tag 84, i.e., one that may include a warning such as: "DANGER" or other type of notification, may be temporarily attached or otherwise situated on the component 20A. The temporary tag 84 in the depicted exemplary embodiment includes its own passive NFC device 88 that functions in the same way as an RFID device, meaning that the NFC device 88 can be interrogated by the NFC transceiver 60 of the client 16 and can provide to the receiver 62 an identification input that is representative of the component 20A. Depending upon the configuration of the NFC device 88, it may additionally be possible to communicate to the client 16 a status input, although this need not necessarily be the case. Still alternatively, the temporary tag 84 may employ an RFID device 90 instead of an NFC device.

It is noted that the NFC device 88 of the temporary tag 84 can separately be interrogated by the NFC device 72 of the component 20. For instance, the temporary 84 can be the DANGER tag mentioned above, or could alternatively be a CAUTION tag or a MAINTENANCE tag, and other such types of tags can be envisioned. The DANGER tag would be one which indicates a potential for death or serious bodily injury, whereas the CAUTION tag indicates a potential for some type of problem or issue that is of less significance than death or serious bodily injury. The MAINTENANCE tag might indicate that active maintenance is being performed on the component. The temporary tag 84 typically will be generated by the business data server 28, and the temporary tag 84 will include some type of indication or representation of the component 20 to which it is to be attached. In the depicted example, the identification is the component number "1-VXS-0020". Since the temporary tag 84 can be mis-positioned by being placed onto a component other than the correct component 20 to which it is supposed to be attached, the NFC device 72 of the component 20 can interrogate the NFC device 88 of the temporary tag 84 and, responsive thereto, can obtain from the NFC device 88 the identity of the component 20 to which the temporary tag is supposed to be attached. When the NFC device 72 obtains this information from the NFC device 88, it can use this information to confirm that the temporary tag 84 is positioned on the component 20 where it is supposed to be situated, such as if the identification of the component 20 that is received from the temporary tag 84 matches the identification of the component that is stored in the NFC device 72 of the component itself. Not only can such a confirmation be communicated by the NFC device 72 to the business data server 28, it can also be transmitted to the client 16, in addition to the NFC device 88 transmitting to the client 16 the identification of the component 20 to which it should be attached. Such confirmation of the placement of the temporary tag 84 increases the robustness of the interaction of the client 16 with the component 20 since the temporary tag 84 potentially can be initially mis-positioned, can fall off and be mis-replaced, or can be otherwise obliterated so that its content cannot be visually discerned. By providing the robust communications ability afforded by NFC communications between the component 20 and the temporary tag 84, further assurance can exist that the maintenance or other operation is being correctly performed on the proper component 20.

In operation, computerized procedures may be delivered from the server 12 to the client 16 as a series of individual steps that are sequentially output on the client 16, with each successive instruction being output on the client 16, such as on the visual display 64 thereof, upon confirmation by the server 12 that the immediately prior instruction has been completed. Such computerized procedures are embodied in the routines 52 and in the logic on the server 12, and include embedded logic that is associated with procedure steps, entry conditions, and continuous actions which are monitored in the background. As the computerized procedure is executed, logic is monitored both on the client 16 and on the server 12, and real time feedback is provided on the client 16 for use by the technician. By additionally enabling identification of one or more particular components 20 as a part of the performance of an operation, which identification is communicated wirelessly between the client 16 and the server 12, the system 4 can employ a higher degree of logic that responds to inputs by a technician. For example, if a component 20 whose NFC device 72 is interrogated by the client 16 turns out to be an incorrect component 20, the server 12 may provide an instruction that is output on the visual display 64 that advises the technician that the component 20 that is the target of the operation is situated ten inches to the left of the component that the technician had just interrogated. Other possibilities will be apparent.

NFC and RFID are wireless technologies that are designed for varying near communication of devices. RFID is known to provide one-way communication without line of sight within one meter. NFC allows for two-way dynamic acquisition of data within a few centimeters. The short range communication scheme can be advantageous in situations where the client 16 can be situated in close proximity to various components 20 and is especially advantageous when the various components 20 can have similar visual appearances. Furthermore, the use of NFC and its two-way dynamic data communication can enable components 20 that are not ordinarily instrumented with direct communication to the server 12 to be capable of being interrogated by the client 16 and to have relevant status information relayed to the server 12 via the client 16.

Desirably, the system 4 takes advantage of the automatic recognition of components 20 and their status via NFC and/or RFID (depending upon the needs of the particular application) in order to ensure correct operation and status of the correct component 20. Alternate embodiments would permit identification of components 20 such as via the barcode 80, through character recognition, or via QR tags or the like without limitation.

The system 4 is usable to perform an operation, such as a maintenance operation or other operation, on a facility such as the nuclear power plant that is represented by the nuclear containment 8. While the server 12 and the client 12 are depicted in FIG. 1 as being used inside the nuclear containment 8, it is expressly noted that either or both can be used outside the containment without departing from the present concept. The operation may involve a particular component 20 from among the plurality of components 20, and the client 16 is usable in identifying whether a given component 20 of the facility is the particular component that is the subject of the operation. An instructed activity of the operation, such as a first instructed step in a sequence of steps, can be communicated from the server 12 to the client 16 as a wireless signal. The instructed activity can then be output on the client 16, such as in the form of text that is displayed on the visual display 64. The client 16 can then receive from the interrogated NFC device 72 of a given component 20 an identification input that is representative of an identity of the given component 20. The identification input can then be employed, on the server 12 or on the client 16 or on both, to confirm that the given component 20 whose NFC device 72 was just interrogated is, in fact, the particular component 20 that is the subject of the current operation.

The instructed activity can then be considered by the server 12 or the client 16 or both to have been completed, and the server 12 can then communicate to the client 16 a signal that is representative of another instructed activity of the operation. For instance, the first instructed activity that may be output on the visual display 64 may be something to the effect of: "IDENTIFY COMPONENT 1-VXS-0020". This instructed activity can be concluded to have been completed once the component 20A of FIG. 2 has been scanned by the client 16 by interrogating its NFC device 72, and its identity confirmed by the server 12 and/or the client. Afterward, the next instructed activity that could be output on the visual display 64 might be something such as "CONFIRM THAT COMPONENT 1-VXS-0020 IS IN AN OFF CONDITION", by way of example.

As mentioned above, a part of the interrogation of the NFC device 72 can include receiving from the NFC device 72 a status input that is representative of a status of the given component 20A. The status and/or the identification input can be employed as inputs to the logic routine that is executed on the server 12 and/or on the client 16.

It thus can be seen that the server 12/client 16 architecture provides dynamic updating of information on the server as well as on the client 16 regarding the facility. Other advantages will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the foregoing disclosure.

What is claimed is:

1. A method of employing a server and a client in performing an operation on a facility, the facility having a plurality of components, the operation involving a particular component from among the plurality of components, the client being remote from the server, the client and the server being in communication with one another, comprising:
   communicating from the server to the client a signal that is representative of an instructed activity of the operation;
   outputting on the client device a visual output that is representative of at least a portion of the instructed activity and that includes a description of a given component of the plurality of components;
   interrogating the given component with the client;
   receiving on the client from the given component an identification input that is representative of an identity of the given component;
   employing the identification input to make a confirmation that the given component is the particular component; and
   based at least in part on the confirmation, concluding that the instructed activity is completed.

2. The method of claim 1 further comprising:
   responsive at least in part to the concluding, communicating from the server to the client a signal that is representative of another instructed activity of the operation; and
   outputting on the client device another visual output that is representative of at least a portion of the another instructed activity.

3. The method of claim 1 further comprising further interrogating with the client the given component and, responsive thereto, receiving from the given component a status input that is representative of a status of the given component.

4. The method of claim 3 further comprising communicating the status input from the client to the server.

5. The method of claim 4 further comprising executing a routine on the server, and employing the status input as an input to the routine.

6. The method of claim 3 wherein the interrogating comprises interrogating with the client at least one of a near field communication (NFC) device and a radio frequency identification (RFID) device of the given component.

7. The method of claim 6 further comprising interrogating with the client at least one of a near field communication (NFC) device and a radio frequency identification (RFID) device of a temporary tag attached to the given component.

8. The method of claim 7 further comprising:
   further interrogating with the client a near field communication (NFC) device of the given component and, responsive thereto, receiving from the given component a status input that is representative of a status of the given component;
   interrogating with the client a near field communication (NFC) device of a temporary tag attached to the given component;

interrogating with the NFC device of the given component the near field communication (NFC) device of the temporary tag;

receiving on the NFC device of the given component from the near field communication (NFC) device of the temporary tag a further identification input that is representative of an identity of a specific component of the plurality of components td which the temporary tag is intended to be applied;

employing on the NFC device of the given component the further identification input to snake a determination that the specific component is the particular component;

based at least in part on the determination, further concluding that the temporary tag is correctly attached to the particular component.

9. A system usable in performing an operation on a facility having a plurality of components, the operation involving a particular component from among the plurality of components, the system comprising:

a server device;

a client device remote from the server device and being, in communication therewith the client device comprising:

a processor apparatus comprising a processor and a memory, an input apparatus structured to provide input signals to the processor apparatus, an output apparatus structured to receive output from the processor apparatus;

the memory having stored therein instructions which, when executed on the processor, cause the system to perform operations comprising:

communicating from the server to the client a signal that is representative of an instructed activity of the operation;

outputting on the client device a visual output that is representative of at least a portion of the instructed activity and that includes a description of a given component of the plurality of components;

interrogating the given component with the client;

receiving on the client from the given component identification input that is representative of an identity of the given component;

employing the identification input to make a confirmation that the given component is the particular component; and based at least in part on the confirmation, concluding that the instructed activity is completed.

* * * * *